W. S. HAIGHT.
Hopping Beer.
No. 66,833.
Patented July 16, 1867.
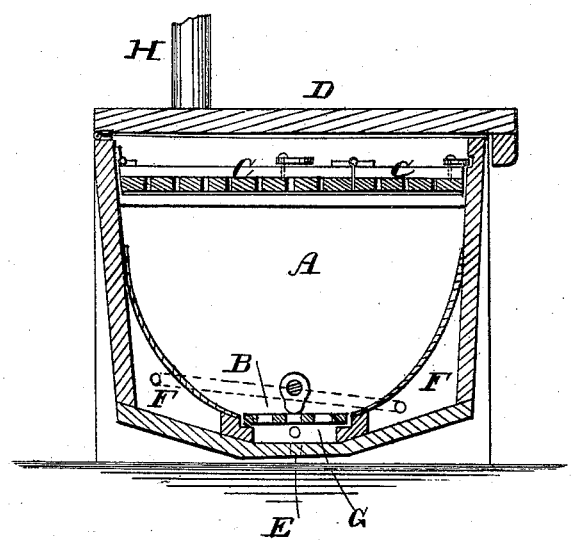

United States Patent Office.

WILLIAM S. HAIGHT, OF WATERFORD, NEW YORK.

Letters Patent No. 66,833, dated July 16, 1867.

---

IMPROVED PROCESS OF "HOPPING" BEER, ALE, &c.

---

*The Schedule referred to in these Letters Patent and making part of the same.*

---

TO ALL WHOM IT MAY CONCERN:

Be it known that I, WILLIAM S. HAIGHT, of Waterford, Saratoga county, New York, have invented a new and improved Process of Hopping Beer; and I do hereby declare that the following is a full, clear, and exact description thereof, which will enable others skilled in the art to make and use the same, reference being had to the accompanying drawing, forming part of this specification.

The drawing represents a vertical cross-section of my improved hop-extracter.

The object of this invention is to so treat the hops, and to so construct the vessel into which they are placed, that when the beer is added to the hops, the whole aroma of the hops will be extracted by the beer, and retained therein.

In the present mode of brewing, the malt to be brewed is first ground, and the water to steep the malt in is heated in the boiling-copper or tub to the temperature wanted; after which a certain amount of water is run into the mash-tub, and the malt is added to it and steeped for about two hours, when the first wort is run off from the mash-tub to the underback below; then another quantity of water is run on the malt from the boiling-tub, and the malt is again steeped, and the second wort is run into the underback. As soon as the first extract is run off it is pumped to the boiling-tub to be boiled; the second wort is treated in the same way; and when they are boiled to near the gravity wanted for the beer, the hops are put in the boiling-tub with the beer, and boiled from fifteen to thirty minutes, then the beer is run from the boiling-tub and separated from the hops. The beer is then cooled and carried to the fermenting-tub. Mine is an improved manner of taking the extract from hops for the manufacture of beer, ale, porter, and lager bier.

For said purposes I use an air-tight tub, A, with a perforated false bottom, B, to act as a strainer, and an upper inner perforated cover, C, to keep the hops submerged, and an outer close cover, D, to make the extracter tight, and also a discharge pipe, E, from the bottom for running off the beer. Two steam-chambers F, for keeping up the heat in the extraction, and a steam-receiving pipe and steam-discharge pipe to pass in and discharge the steam from the chambers F, and also a steam pipe, G, to pass the steam under the hops when desired, are arranged in my apparatus. Through a pipe, H, the beer is conducted into the vessel A, the hops being held between the bottoms B and C, of which the latter is hinged for the purpose of allowing the easy removal and insertion of the hops.

The manner of taking the extract from one hundred pounds of hops by this process is as follows: One hundred pounds of hops are placed into the extracter one hour before the beer is to be run from the boiling-tub, and fifty gallons of water are poured over the hops at boiling heat, and the extracter closed and the hops steeped and steamed until the beer in which the extract is to be used is ready to be run over the hops, then the extracter, which holds two hundred gallons, is filled with the boiling beer, and the same is left to steep fifteen minutes, when it is run off from the discharging pipe E below the false bottom B. The extracter is then again filled with boiling beer, and the same is steeped ten minutes and discharged as before, and the process is continued until all the beer is passed over the hops and out of the discharge pipe. When the hops have been drained, the discharge pipe is closed, and fifty gallons of water are run on the hops, and this extract may be run into the beer that is being made, or kept in the extracter for the next brewing, in which case it is to be added to the first worts, or it may be heated for steeping the next hundred pounds of hops to be used. As the hop-extracter in this example holds two hundred gallons, there were fifty gallons of water in the first steep to prepare the hops, and one hundred and seventeen gallons of beer. Each of the following steepings would contain one hundred and sixty-seven gallons of beer, that being the amount the extracter will hold with one hundred pounds of hops. It will be seen that if the hops were used for thirty-three barrels of beer, they would have been subjected to five different steepings of boiling beer, and if for fifty barrels, they would be subject to nine steepings. By first adding boiling water to the hops and letting them steep for an hour, the hops thoroughly prepared to give off all of their extract, and being kept in a close vessel, none of the aroma is lost; and by adding the last water to them after the beer has been run over them, one-half the beer that is retained by them is saved. In boiling hops in beer as is now done, the aroma of the hops is continually passing off in vapor and is lost, and also the beer which the hops retain, and which is one-half gallon of beer for each pound of hops used, is also all lost, and as the beer they retain is flavored as much as the beer that is run off, there is that amount of hop extract lost. In my process the amount of beer lost by retention is small, and that comparatively fresh, it being the last run on the hops, the amount previously run on having taken most of the extract from the hops, and thus the aroma of the hops is saved, they being confined while the extract is being made. It will be observed in the process described that one hundred gallons of water have been used on the hops. If the beer is to be kept to the gravity it leaves the boiling-tub or copper, sugar sirup is to be added to make the gravity good. If the beer is twenty-four pounds gravity, there would be needed, for the first water used on the hops, forty pounds of sugar sirup to fetch the water to that gravity, and from that fifty gallons of beer are made, and if the extract that is on the hops after the beer has been run is also used, fifty gallons more beer will be gained by adding twenty pounds of sirup, as that extract will be a trifle more than half the original gravity of the beer. Thus it will be seen that one hundred gallons of beer more are made at an expense of sixty-three pounds of sugar sirup, or five and one-quarter gallons of sirup, at twelve pounds to the gallon, and the hops will flavor this extra amount of beer, in this manner of using them, better than the lesser amount of beer would be in the present manner of using them. In the present manner of brewing, if the one hundred pounds of hops had been used for fifty barrels beer, there would be lost, by retention of hops, fifty gallons of beer, while this process would give a gain of fifty gallons, making a difference of one hundred gallons, or three and one-third barrels. By this process all the aroma of the hops is saved, and a better hop flavor given the beer from the same quality of hops. One-half of the beer that is retained by the hops as now used by brewers is saved by my process. Five per cent. more extract is obtained from hops by this process than by the usual method.

Another mode of taking the extract from the hops is as follows: First place the hops in the extracter and close the same tight, then run a jet of steam into the extracter from under the lower inner perforated cover, through the passage G, and steam the hops for an hour before the beer is ready to be run over them; this will thoroughly prepare them to give off their extract freely. Then run the beer at boiling heat on the hops from the copper until the extracter is full; let the same stand fifteen minutes and run it off to be cooled; then again fill the extracter, and let it stand as before, and run off, and so continue until all the beer is passed over the hops, after which add to the hops in the extracter one-half gallon of water for each pound of hops therein contained, let the same stand five minutes, and it may be run into the beer just passed over, or kept to add to the first worts of the next beer to be made, or be used to steep the next hops in that are to be used.

Having thus described my invention, what I claim as new, and desire to secure by Letters Patent, is—

1. The process herein specified of extracting hops by placing the same into an air-tight vessel, and applying the beer, substantially in the manner herein specified.

2. Applying steam to the hops when the same are contained in an air-tight vessel, preparatory to the application of the beer, substantially as set forth.

3. The process herein set forth of removing the beer from the hops, from which the extract has been taken by the application of water, as set forth.

WILLIAM S. HAIGHT.

Witnesses:
WM. F. McNAMARA,
ALEX. F. ROBERTS.